March 22, 1938.    R. WINKELMEYER ET AL    2,111,653
HEAD LAMP CONSTRUCTION
Filed Jan. 2, 1937    3 Sheets-Sheet 1
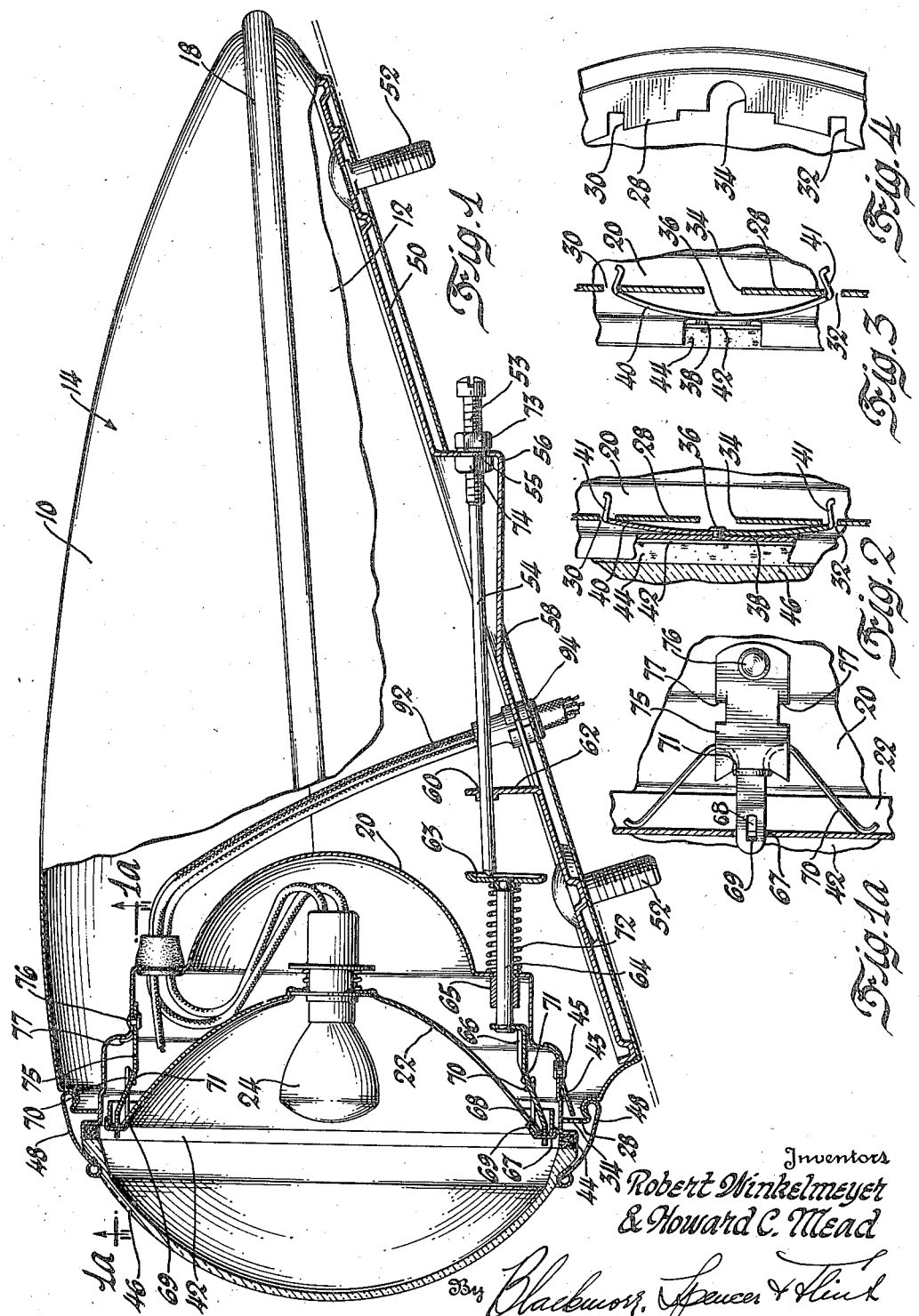
Inventors
Robert Winkelmeyer
& Howard C. Mead
By Blackmore, Spencer & Flint
Attorneys

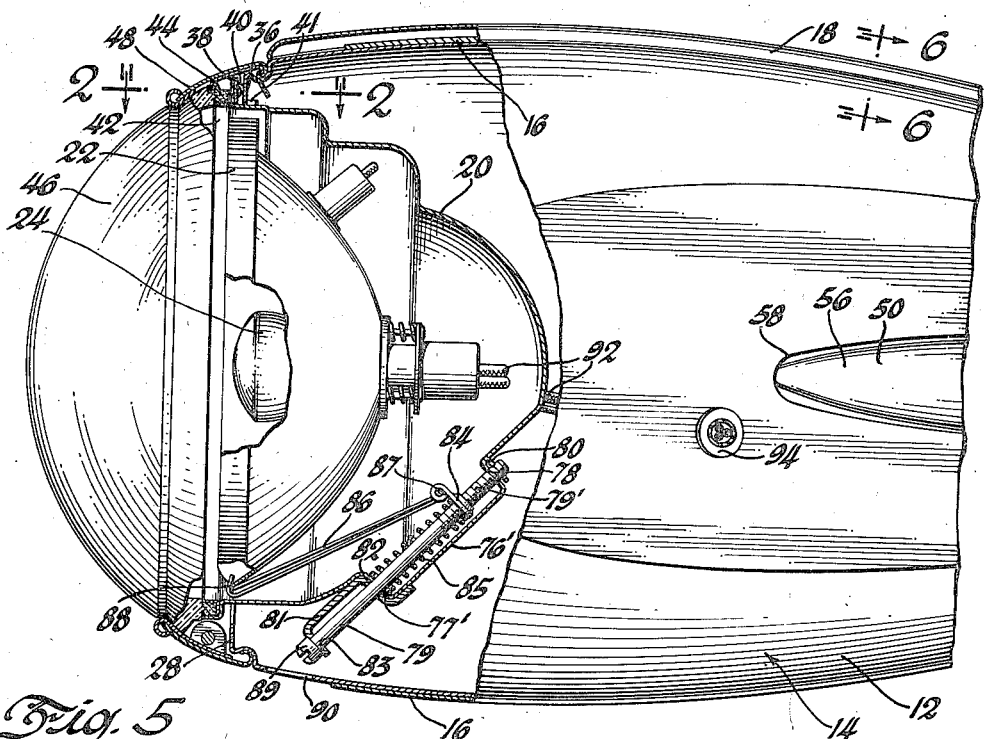
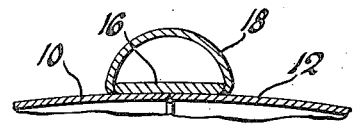
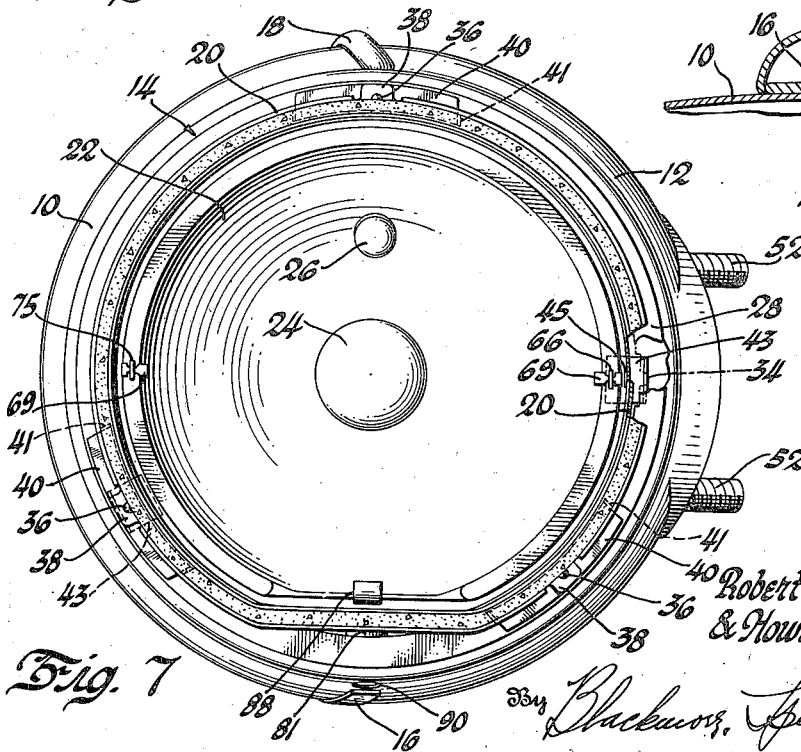

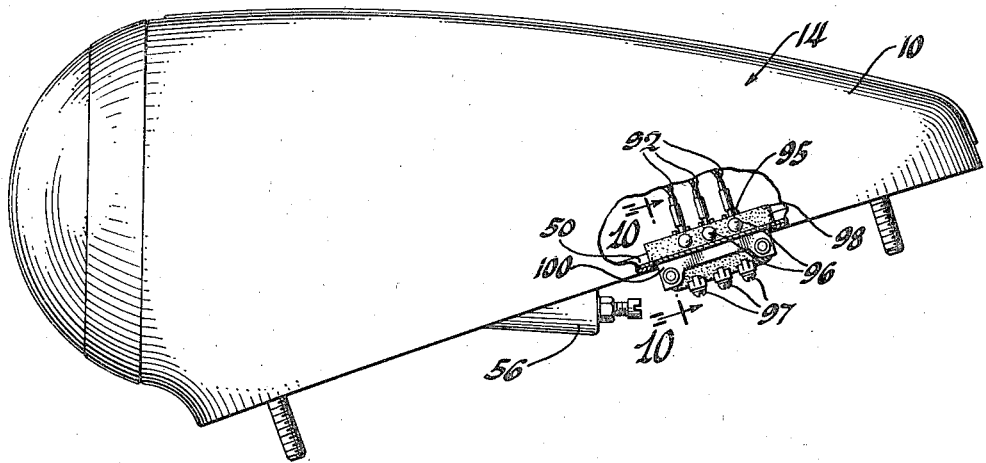
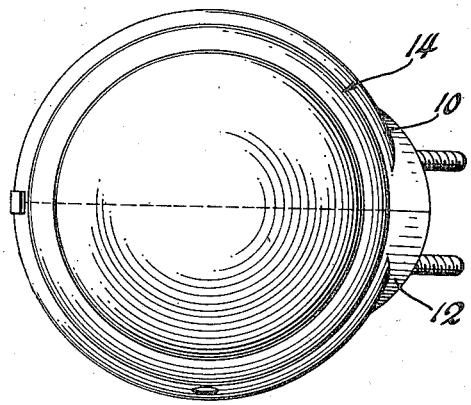
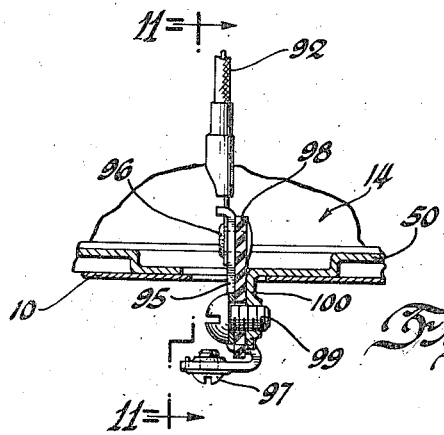
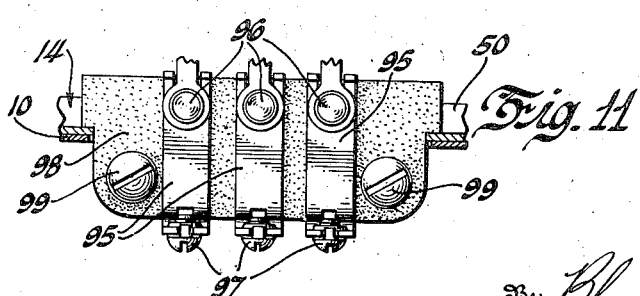

Patented Mar. 22, 1938

2,111,653

UNITED STATES PATENT OFFICE 2,111,653

HEAD LAMP CONSTRUCTION

Robert Winkelmeyer and Howard C. Mead, Anderson, Ind., assignors to General Motors Corporation, Detroit, Mich., a corporation of Delaware Application January 2, 1937, Serial No. 118,750

5 Claims. (Cl. 240—41.5)

This invention relates to illuminating apparatus and more specifically to improvements in vehicle headlamps.

The invention comprises certain improvements in headlamp constructions of the type described in the application of Clarence A. Michel, Howard C. Mead and Robert Winkelmeyer, Serial No. 63,500, filed February 12, 1936. It will be understood, however, that certain features of our invention have application to other types of headlamps than that illustrated and described in the above mentioned application.

In the type headlamp illustrated in application Serial No. 63,500, an outer headlamp casing is rigidly fixed to the body or frame of a vehicle and an inner casing or sub-body is mounted within the outer casing. Adjacent flanges of the two casings are secured to each other by a bayonet type joint. In order to adjust the headlamp beam, a reflector mounted within the open end of the inner casing is provided with means for adjusting the same in two planes while the casing remains in fixed position.

Where an outer casing of a greatly elongated shape is to be used it may be necessary or desirable to draw the same in two parts which then may be welded or otherwise secured together to form the headlamp body. Where the outer casing is formed in this manner there is no assurance that the flange formed at the open end thereof to which the flange of the sub-body is to be secured will be perfectly round and hence the bayonet type joint means described in the above identified application may be not entirely satisfactory. Accordingly, it is an object of our invention to provide a headlamp construction in which improved means involving flat spring members are provided for securing together an outer casing and an inner casing or sub-body.

In the type headlamp described, the spring pressure applied to the sub-body by the adjustment means tends to constantly urge the sub-body away from the main body. Where flat spring-like members are used to secure the main and sub-body flanges together the spring pressure of the adjustment means tends to cause the sub-body to "pop" or spring out of the main body when the door is removed. It is an object of our invention to provide a means of simple construction and one economical to manufacture for preventing the sub-body from springing out of the main body when the cover is removed.

It is also an object of our invention to provide a headlamp utilizing a novel form of connector and terminal block for joining the lamp leads to the vehicle wiring.

It is also an object of our invention to provide a headlamp of an elongated or generally streamlined shape and of pleasing appearance.

A further object of our invention is to provide a new and improved gasket retaining ring.

A specific object of our invention is the provision of a flat spring member for securing the flanges of a main body and sub-body to each other.

Other advantages and objects of our invention reside in the construction and arrangement of parts as will become more apparent as the description proceeds. Reference is herein made to the accompanying drawings forming a portion of this specification in which:

Figure 1 is a plan view with parts broken away showing a headlamp embodying our invention.

Figure 1A is a view on line 1A—1A of Figure 1.

Figure 2 is a detail view with parts in section taken substantially on line 2—2 in Figure 5.

Figure 3 is a detail view showing one of the retaining springs and the manner in which the flanges of the main and sub-bodies are secured together.

Figure 4 is a detail view of a portion of the main body and flange thereof.

Figure 5 is a view with parts broken away, taken at right angles to Figure 1.

Figure 6 is a sectional view on line 6—6 in Figure 5.

Figure 7 is an end view of the headlamp of Figure 5 with the cover removed.

Figure 8 is a plan view with parts broken away of a headlamp generally similar to the headlamp of Figure 1, having a different form of connector than that of Figure 1.

Figure 9 is an end view of the headlamp of Figure 8.

Figure 10 is a view on line 10—10 in Figure 8.

Figure 11 is a view on line 11—11 in Figure 10, looking toward the right.

In the drawings, 10 and 12 are the two parts of the main or outer casing generally indicated at 14. Due to the fact that the headlamp is long and narrow the two parts are preferably formed of separate stampings which are welded or otherwise suitably secured together. Figure 6 illustrates one way in which the two parts 10 and 12 may be welded together to form the outer casing. A binder strip 16 is shown as overlapping the adjacent edges of the parts 10 and 12 and said edges may be spot welded to the binder strip. Preferably a stainless steel or other ornamental bead 18 will be "snapped" over the binder strip and secured thereto in order to conceal the spot or other weld marks on the binder strip.

Within the open end of the main or outer casing is a sub-body 20, within which is a reflector 22 to which are secured bulbs 24 and 26 for illuminating purposes. A flange portion 28 of the outer casing at spaced points has notches 30, 32 and 34 formed therein. Riveted at 36 to a flange portion 38 of the sub-body at spaced points are three springs 40, having bent end portions 41, see Figures 2, 3 and 7. The ends of the springs engage the slots 30 and 32 and act to secure the main and sub-bodies together. The result is a resilient connection between the adjacent flange portions. This construction provides an easily manufactured simple connecting means having certain advantages over the bayonet type illustrated in application, Serial No. 63,500, especially where used with a lamp body formed in two sections.

The open end of the subcasing has a channel-shaped gasket retaining ring 42, having a cork or other suitable gasket 44 therein. A glass lens, or other transparent cover, 46 is secured to gasket 44 by means of ring member 48.

A reinforcing plate 50 within the outer casing rigidly secures the lamp to the frame or body of the vehicle by means of bolts 52. Preferably, the lamp body is secured to the side of the radiator of the vehicle.

In order to adjust the headlamp beam in both horizontal and vertical planes, means are provided to move the reflector within the sub-body. For adjusting the reflector about a vertical axis the means best illustrated in Figure 1 is used. A rod member 54 is provided which has a threaded end 53 passing through an opening 55 in a pressed out portion 56 in the reinforcing plate member 50. The pressed out portion 56 and threaded end of the rod member fit within an opening 58 in the lamp body which enables the adjustment to be made from within the radiator shell by raising the hood of the vehicle. The rod 54 is slidably supported near its opposite end in an opening 60 in an upstanding portion 62 of the reinforcing plate member 50, said rod end contacting a disc-like member 63 secured to one end of a rod 64 which is slidable within a sleeve 65 fixed to the back of the sub-body. A strap member 66 is secured at one end to the rod 64 and the opposite end passes through an opening 67 in the reflector and has an elongated slot 68 therein. A retaining member 69 passes through the slot 68 and prevents the strap end from being withdrawn through the opening in the reflector. A spring member 70 contacts a shoulder 71 on strap 66 and forms a resilient connection between the strap and reflector. A coil spring 72 contacts the back of the sub-body and the disc-like member 63 and tends to force the rods 54 and 64 to the right as viewed in Figure 1. Locking nuts 73 and 74 on rod 54 may be loosened, whereupon the rod may be rotated in either direction the desired amount to move the rod 54 longitudinally back and forth.

Diametrically opposite the strap and opening in the reflector just described, is a somewhat similar strap 75 riveted or otherwise suitably secured at 76 to the sub-body. As best seen in Figures 1 and 1A, one or more inturned lugs 77 on the strap assist in fixedly securing the same to the sub-body. The opposite end of the strap passes through an opening 67 in the reflector and is held therein by means of a retaining member 69. Also, a spring member 70 is provided, as in the case of the strap 66. The connection between the strap 75 and the reflector acts as a vertical pivot about which the reflector may be moved by movement of rod 54, etc., in order to adjust the beam in a horizontal plane.

For raising and lowering the headlamp beam the reflector is tilted about a horizontal axis. The means provided for this purpose is best seen in Figure 5. The sub-body has a portion 76' stamped therein having openings 77' and 78 through which a rod member 79 is adapted to freely rotate, one end of the same being threaded as shown at 79'. A cotter pin 80 prevents the rod 79 from coming out of the openings. A spacing member 81 engages one end of the stamped portion 76' and has openings 82 and 83 therein through which passes the rod 79. On the threaded portion of rod 79 is a traveling nut 84. Surrounding the rod and engaging one end of the pressed out portion in the sub-body is a coil spring 85 adapted to maintain the slotted head 89 of the rod against the spacing member and aid in feeding the traveling nut along the threaded portion of the rod.

A double strap member 86 is pivoted at one end at 87 to the traveling nut and the opposite end engages the periphery of the reflector at 88. An opening 90 in the main body permits a screw driver or other suitable instrument to be inserted to engage the slotted head 89 in order to rotate the rod to cause the nut 84 to travel in either direction. Movement of the nut 84 will cause the reflector to be moved about a horizontal axis to raise and lower the beam of the headlamp.

The spring pressure from the adjusting means is constantly urging the sub-housing outwardly and if the door of the lamp were removed for any reason the subcasing would tend to move outwardly with respect to the main casing. To prevent this a restraining means is provided. The end portions 41 of the several springs are bent sharply inwardly and are slightly inclined toward each other as seen in Figures 2 and 3. The bent ends engage the inner edges of the slots 30 and 32 and act as a restraining means. This is usually not sufficient and we prefer to provide one or more spring means 43, secured to the sub-body 20 as by means of rivets 45. The free ends of these springs will be bent inwardly toward the sub-body during the assembly operation and will then spring outwardly behind the flange 28 of the main body as seen in Figures 1 and 7. When spring pressure from the adjusting means is applied to the subcasing the ends of the springs 43 will be forced against the rear of the flange of the main casing and act as a restraining means to prevent the sub-body from "popping" or springing out of the main body. If for any reason it is desired to remove the subcasing, a screw driver or other pointed instrument may be inserted in the opening 34 and pressure applied to the free end of the spring 43 in order to press the same toward the sub-casing whereby the spring will free the flange on the outer body.

In the form of headlamp illustrated in Figures 1–7 inclusive, the insulated wires 92 pass through a sleeve 94 fixed to the plate and main body and thence to the car wiring which connects the source of electrical energy thereto. In some installations we prefer to use the form of terminal block and connection illustrated in Figures 8, 10 and 11. In this case, the several lead wires are connected to terminal members 95, as by means of rivets 96. The car wiring will then be secured to the several terminals by means of screws 97. The several terminals are insulated from each other and from the lamp body by means of member 98 which is secured by means of two screws 99 to a bent out tang member 100 formed in the retaining plate 50. The member 98 will be formed of any suitable non-conducting material, as for example, bakelite. In the modification of Figures 8, 9, 10 and 11 the two sections of the outer body are also welded together to form the complete outer body 14. In this instance, the sections are welded together in a plane at right angles to that shown in Figures 1, 5, 6 and 7.

It will be understood that various changes and modifications may be made in the construction disclosed without departing from the spirit of our invention and we do not wish to limit the patent granted thereon other than as defined in the appended claims when construed by the prior art.

We claim:

1. In a headlamp, a body having an inwardly projecting flange having slots therein, a sub-body having a flanged edge adjacent said body flange, means for securing the two flanges together comprising a substantially flat spring member attached near the middle thereof to the sub-body flange and having bent free end portions extending into the slots in the body flange, a reflector mounted within the sub-body, a light bulb fixed to the reflector, electrical connections to the bulb, means for adjusting the reflector in two planes at right angles to each other, a door for securing the several parts together and means fixed to said sub-body adapted to engage the rear of the body flange to prevent the sub-body from "popping" out of said body when the door is removed.

2. A headlamp as in claim 1 in which the electrical connection to the light bulb comprises lead wires and a terminal block removably secured to the outer casing of the headlamp and having a portion projecting therethrough.

3. A device as in claim 1 in which the flanged body member is formed of two flanged parts welded together.

4. In a headlamp, a body member having an inwardly directed flange having slots therein, a sub-body having a flanged edge adjacent said body flange, a substantially flat spring member fixed to said sub-body flange and having bent ends engaging said slots to secure the body and sub-body together, a reflector within the sub-body, a light bulb fixed to the reflector, an annular gasket, a lens, means for securing the lens and gasket to the body member, means accessible from outside the body for adjusting the reflector and bulb in a vertical plane, means accessible from outside the body for adjusting the reflector and bulb in a horizontal plane, a member secured to the sub-body for engaging the rear of the body flange in order to prevent the sub-body from "popping" out of the body when the lens and retaining means is removed.

5. In a headlamp, a body having an inwardly projecting flange having slots therein, a sub-body having a flanged edge adjacent said body flange, means for securing the two flanges together comprising a substantially flat spring member attached near the middle thereof to the sub-body flange and having bent free end portions extending into the slots in the body flange, a reflector mounted within the sub-body, a light bulb carried by the reflector, electrical connections to the bulb, means for adjusting the reflector, a door for securing the several parts together and means fixed to said sub-body adapted to engage the rear of the body flange to prevent the sub-body from "popping" out of said body when the door is removed.

ROBERT WINKELMEYER.
HOWARD C. MEAD.